(12) United States Patent
Ishikawa et al.

(10) Patent No.: US 12,736,114 B2
(45) Date of Patent: Sep. 15, 2026

(54) BALL SCREW DEVICE

(71) Applicant: NTN CORPORATION, Osaka (JP)

(72) Inventors: Shintarou Ishikawa, Shizuoka (JP); Yoshinori Ikeda, Shizuoka (JP)

(73) Assignee: NTN CORPORATION, Osaka (JP)

(*) Notice: Subject to any disclaimer, the term of this patent is extended or adjusted under 35 U.S.C. 154(b) by 2 days.

(21) Appl. No.: 18/689,237

(22) PCT Filed: Aug. 25, 2022

(86) PCT No.: PCT/JP2022/032024
§ 371 (c)(1),
(2) Date: Aug. 19, 2024

(87) PCT Pub. No.: WO2023/042635
PCT Pub. Date: Mar. 23, 2023

(65) Prior Publication Data

US 2025/0271050 A1 Aug. 28, 2025

(30) Foreign Application Priority Data

Sep. 15, 2021 (JP) ................................ 2021-150471

(51) Int. Cl.
*F16H 25/20* (2006.01)
*F16C 31/06* (2006.01)
(Continued)

(52) U.S. Cl.
CPC ......... *F16H 25/2214* (2013.01); *F16C 31/06* (2013.01); *F16H 25/24* (2013.01)

(58) Field of Classification Search
CPC ...... F16H 25/2214; F16H 31/06; F16H 25/24; F16H 25/2204; F16H 25/20; F16H 25/22
See application file for complete search history.

(56) References Cited

U.S. PATENT DOCUMENTS 2,995,948 A * 8/1961 Galonska ............ F16H 25/2214 74/424.87
2012/0000306 A1* 1/2012 Chen .................. F16H 25/2214 74/424.86
(Continued)

FOREIGN PATENT DOCUMENTS

CN 111140627 A * 5/2020 ......... F16H 25/2238
EP 1 245 868 10/2002
(Continued)

OTHER PUBLICATIONS

International Search Report (ISR) issued Nov. 15, 2022 in International (PCT) Application No. PCT/JP2022/032024.

*Primary Examiner* — Zakaria Elahmadi
(74) *Attorney, Agent, or Firm* — Wenderoth, Lind & Ponack, L.L.P.

(57) ABSTRACT

A ball screw device includes a nut including a nut main body and a cover, a screw shaft, a rolling path formed by a screw groove of the nut main body and a screw groove of the screw shaft, a circulation path formed by an outer circumferential surface of the nut main body and the cover, a pair of connection paths that allow one end of the circulation path and one end of the rolling path to be communicated with each other and allow the other end of the circulation path and the other end of the rolling path to be communicated with each other, respectively, and a large number of balls disposed in the rolling path, the circulation path, and the pair of connection paths. The circulation path is formed along a cylindrical path of the outer circumferential surface of the nut main body.

13 Claims, 7 Drawing Sheets

(51) Int. Cl.

| | |
|---|---|
| ***F16H 25/22*** | (2006.01) |
| ***F16H 25/24*** | (2006.01) |

(56) References Cited

U.S. PATENT DOCUMENTS

| | | | | |
|---|---|---|---|---|
| 2018/0100566 A1* | 4/2018 | Yamazaki | ........... | F16H 25/2214 |
| 2020/0200245 A1* | 6/2020 | Zinnecker | ........... | F16H 25/2427 |

FOREIGN PATENT DOCUMENTS

| | | | | |
|---|---|---|---|---|
| JP | 2002-276764 | 9/2002 | | |
| JP | 2002-295625 | 10/2002 | | |
| JP | 2008-169983 | 7/2008 | | |
| JP | 2016-105000 | 6/2016 | | |
| JP | 2019-210996 | 12/2019 | | |
| WO | WO-2016088546 A1 * | 6/2016 | ......... | F16H 25/2214 |

* cited by examiner

BALL SCREW DEVICE

TECHNICAL FIELD

The present invention relates to a ball screw device.

BACKGROUND ART

In a ball screw device, a large number of balls are rollably disposed in a rolling path constituted by a screw groove formed on an inner circumference of a nut and a screw groove formed on an outer circumference of a screw shaft, and the balls that have reached an end point of the rolling path are returned to a start point of the rolling path via a circulation path.

As a method of circulating the balls of the ball screw device, a tube type (see, for example, Patent Literature 1 below) in which a circulation path is formed by using a tube and a guide plate type (see, for example, Patent Literature 1 below) in which a circulation path is formed by using a guide plate fixed to an outer circumference of a nut are known.

A tube type ball screw device has a structure in which a tube protrudes from an outer circumference of a nut, which leads to an increase in size of the ball screw device.

On the other hand, in a guide plate type ball screw device 100, a circulation path 112 is formed by a nut main body 103 and a guide plate 105 fixed to an outer circumference of the nut main body 103, as illustrated in FIG. 14. In the ball screw device 100, balls that have reached an end point of a rolling path 108 formed by a screw groove 107 of the nut main body 103 and a screw groove 106 of a screw shaft 102 are returned to a start point of the rolling path 108 via a connection path 110, the circulation path 112, and other connection paths (not illustrated). In the ball screw device 100, the guide plate 105 does not protrude from the outer circumference of the nut main body 103, and therefore the ball screw device can be reduced in size as compared with the above tube type ball screw device.

CITATIONS LIST

Patent Literature

Patent Literature 1: JP 2002-295625 A
Patent Literature 2: JP 2002-276764 A

SUMMARY OF INVENTION

Technical Problems

In a ball screw device, it is necessary to smoothly circulate balls in a ball circulation path. For example, in the ball screw device disclosed in Patent Literature 2(see FIG. 14), a direction in which the connection path 110 extends is set to a direction T tangent to the screw grooves 106 and 107 and a lead angle direction, so that behavior of balls 104 at a boundary between the rolling path 108 and the connection path 110 is stabilized.

However, in the ball screw device 100, the guide plate 105 is fixed to a flat surface 103*a* provided on an outer circumferential surface of the nut main body 103, and therefore the circulation path 112 formed by these members is formed along the flat surface 103*a*. In this case, a bent portion 120 is formed at a boundary between the circulation path 112 and the connection path 110, and therefore the balls 104 are caught by the bent portion 120 and the circulation of the balls 104 is hindered. This may undesirably prevent the screw shaft 102 and the nut main body 103 from rotating relative to each other smoothly.

In view of this, an object of the present invention is to smoothly rotate a nut and a screw shaft relative to each other by smoothly circulating a ball of the ball screw device.

Solutions to Problems

In order to attain the above object, a ball screw device according to the present invention includes a nut including a nut main body having a screw groove on an inner circumference thereof and a circulation path forming member fixed to an outer circumferential surface of the nut main body; a screw shaft having a screw groove on an outer circumference thereof; a rolling path formed by the screw groove of the nut main body and the screw groove of the screw shaft; a circulation path formed by the outer circumferential surface of the nut main body and the circulation path forming member; a pair of connection paths that allow one end of the circulation path and one end of the rolling path to be communicated with each other and allow the other end of the circulation path and the other end of the rolling path to be communicated with each other, respectively; and a large number of balls disposed in the rolling path, the circulation path, and the pair of connection paths, in which the circulation path is formed along a cylindrical portion of the outer circumferential surface of the nut main body.

As described above, in the ball screw device of the present invention, the circulation path formed by the outer circumferential surface of the nut main body and the circulation path forming member is formed in an arch shape along a cylindrical portion of the outer circumferential surface of the nut main body. This makes a bending angle at a boundary between the circulation path and the connection path gentle. As a result, the balls are less likely to be caught at this boundary, and the balls can smoothly circulate.

The ball screw device illustrated in FIG. 14 is assembled by arranging the balls 104 in the circulation path 112 formed in the guide plate 105 and then fixing the guide plate 105 to the nut main body 103. In this case, it is necessary to fix the guide plate 105 to the nut main body 103 while paying attention so that the balls 104 do not fall off from the circulation path 112, and therefore workability is poor.

In view of this, a circulation path is preferably formed by a circulation groove formed on a cylindrical portion of an outer circumferential surface of a nut main body and a circulation path forming member covering the circulation groove. In this case, a ball screw device can be easily assembled by disposing balls in the circulation groove formed on the outer circumferential surface of the nut main body and then disposing the circulation path forming member covering the circulation groove from an outer circumferential side.

In a case where the outer circumferential surface of the nut main body has, in a circumferential partial region thereof, a recessed portion recessed toward an inner diameter side relative to the other circumferential region, and the guide plate is accommodated in a depth direction region of the recessed portion, the circulation path forming member does not protrude from the outer circumferential surface of the nut main body, and therefore an outer diameter of the nut can be reduced.

In a case where the circulation path forming member has a groove that forms the circulation path and the groove has, in a bottom portion thereof, an opening extending along a direction in which the groove extends, an outer diameter of the circulation path forming member can be reduced so that an edge of the opening becomes an outermost diameter portion. This makes it easy to secure a space for providing other members on an outer circumferential side of the circulation path forming member.

The circulation path forming member can be fixed to the nut main body by swaging or adhesion.

The ball screw device includes, for example, a coil-shaped ball pickup member screwed into the screw groove of the nut main body. The balls can be guided from the rolling path to the connection path by a guide surface provided at an end portion of the ball pickup member. In this case, when the balls collide with the guide surface of the ball pickup member, the ball pickup member may rotate relative to the nut, and the position of the guide surface may be displaced. In view of this, it is preferable to provide a rotation stopper that restricts relative rotation between the ball pickup member and the nut.

In the ball screw device, the nut main body and an inner ring of a rolling bearing can be integrally formed as one component. Alternatively, the nut main body and the inner ring of the rolling bearing may be formed as separate components, and an attachment surface to which the inner ring of the rolling bearing is attached may be provided on the outer circumferential surface of the nut main body. In this case, the circulation path can be extended to an axial region of the inner ring, that is, an axial region of the attachment surface, and therefore a length of the rolling path can be increased to increase a load capacity of the ball screw device.

In a ball screw device, typically, a screw groove is formed on an entire inner circumferential surface of a nut main body, and a part of the screw groove functions as a rolling path. In this case, it is necessary to provide a member such as a ball pickup member in order to prevent a ball from entering a portion of the screw groove that does not function as the rolling path. In view of this, a cylindrical portion on which the screw groove is not formed may be provided in a region on one side relative to the rolling path in the axial direction on the inner circumferential surface of the nut main body. By thus omitting a screw groove that does not function as a rolling path, it is possible to avoid a ball from entering the screw groove that does not function as the rolling path without providing a member such as a ball pickup member.

Advantageous Effects of Invention

As described above, according to the present invention, it is possible to smoothly rotate a nut and a screw shaft relative to each other by smoothly circulating a ball of the ball screw device.

DESCRIPTION OF EMBODIMENTS

Hereinafter, embodiments of the present invention will be described with reference to the drawings.

Figure 1:
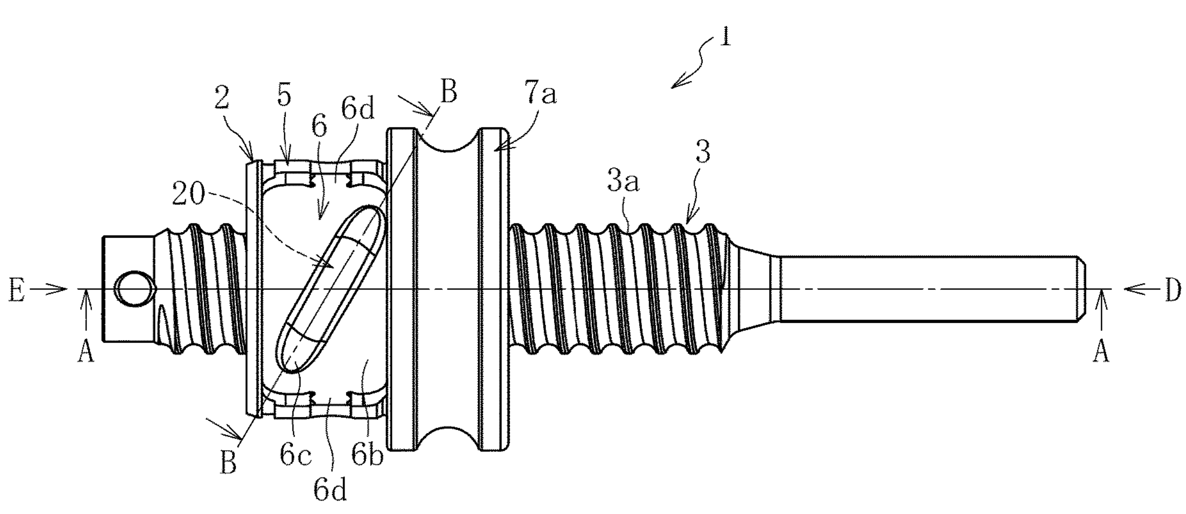
FIG. 1 is a plan view of a ball screw device according to a first embodiment of the present invention.
Figure 2:
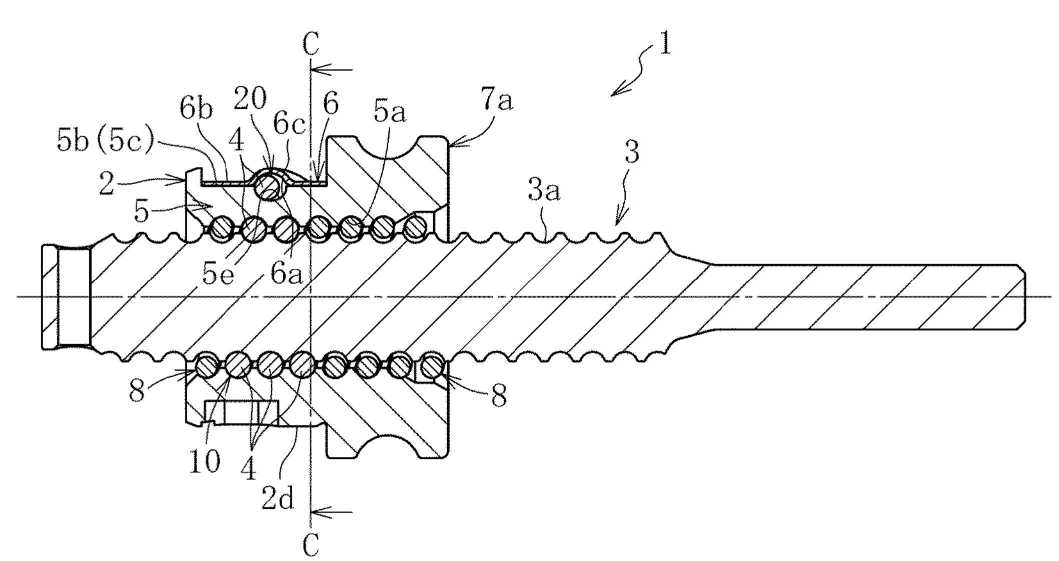
FIG. 2 is a cross-sectional view taken along line A-A in FIG. 1.
Figure 3:
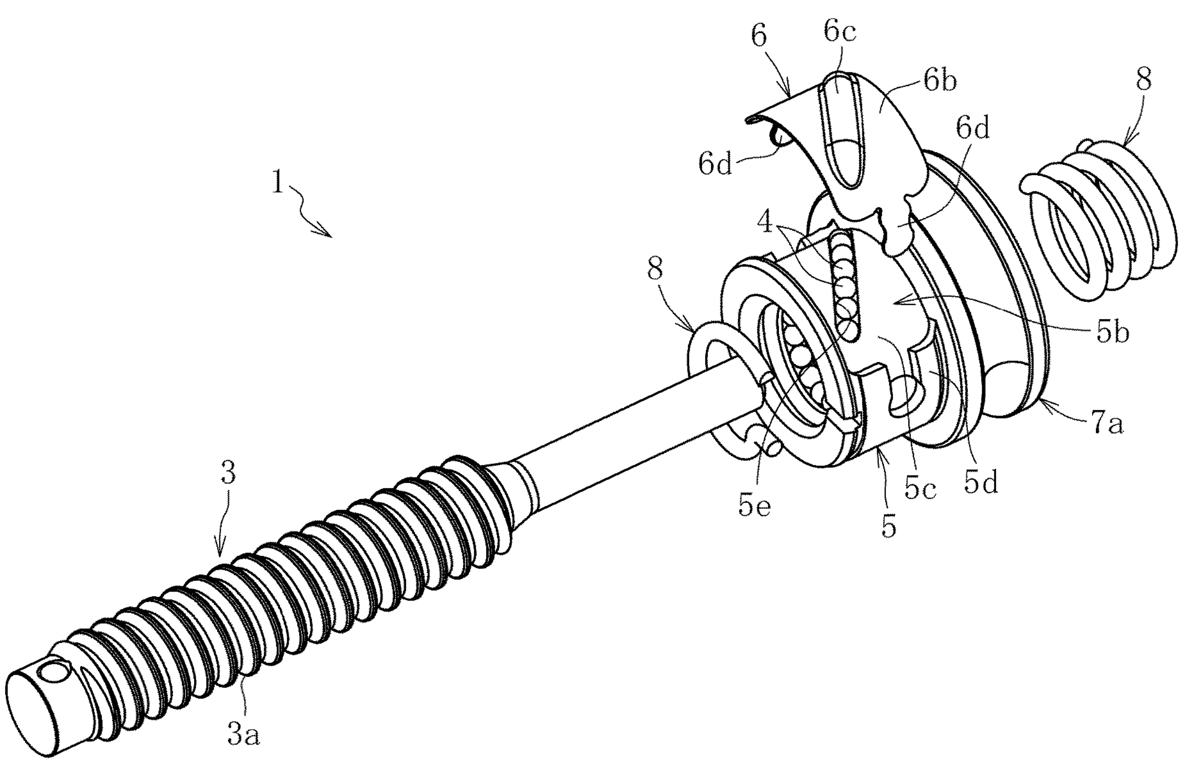
FIG. 3 is an exploded perspective view of the ball screw device of FIG. 1.

As illustrated in FIGS. 1 to 3, a ball screw device 1 according to a first embodiment of the present invention mainly includes a nut 2, a screw shaft 3, and a large number of balls 4. The nut 2 includes a nut main body 5 and a cover 6 as a circulation path forming member. The ball screw device 1 is a nut rotation type in which the nut 2 is rotated to move the screw shaft 3 in an axial direction, and the nut 2 is rotatably supported by a rolling bearing (for example, a deep groove ball bearing). In the present embodiment, the nut main body 5 and an inner ring **7*a*** of the rolling bearing are integrally formed as one component.

A spiral screw groove **5*a* is formed on an inner circumference of the nut main body 5, and a spiral screw groove 3*a* is formed on an outer circumference of the screw shaft 3. A rolling path 10 for the balls 4 is formed by a part of the screw groove 5*a* of the nut main body 5 and a part of the screw groove 3*a* of the screw shaft 3 (see FIG. 2**).

Figure 4:
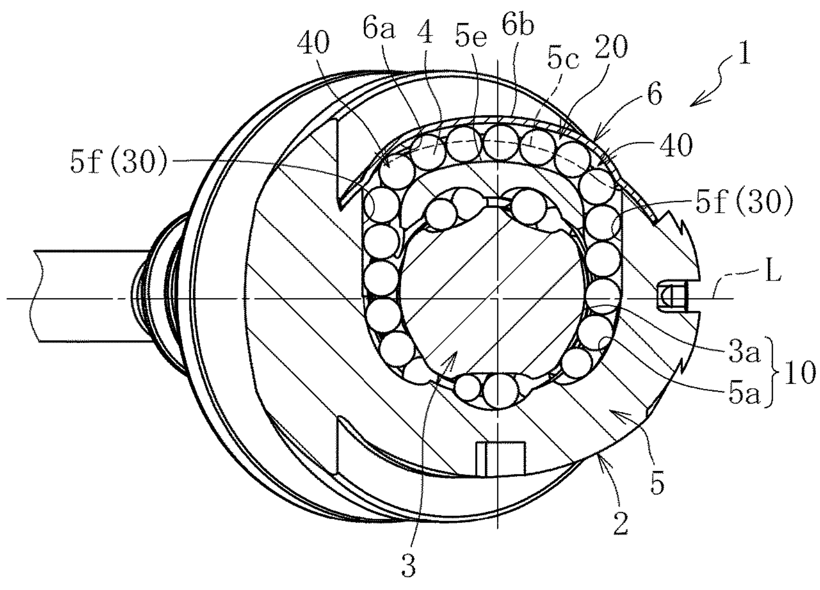
FIG. 4 is a cross-sectional view taken along line B-B in FIG. 1.

As illustrated in FIG. 4, the ball screw device 1 is provided with a circulation path 20 and a pair of connection paths 30 for circulating the balls 4 in the rolling path 10. The circulation path 20 is formed by an outer circumferential surface of the nut main body 5 and a cover 6. The pair of connection paths 30 allows one end of the circulation path 20 and one end of the rolling path 10 to communicate with each other, and allows the other end of the circulation path 20 and the other end of the rolling path 10 to communicate with each other. The large number of balls 4 are rollably disposed in a circulation passage formed by the rolling path 10, the circulation path 20, and the pair of connection paths 30. The balls 4 that have reached an end point of the rolling path 10 are returned to a start point of the rolling path 10 through the one connection path 30, the circulation path 20, and the other connection path 30.

A recessed portion **5*b* is provided in a partial region in a circumferential direction of the outer circumferential surface of the nut main body 5 (see FIG. 3). A cylindrical portion 5*c* is provided on a bottom surface of the recessed portion 5*b*. A large-diameter cylindrical portion 5*d* having a larger diameter than the cylindrical portion 5*c* is provided in a circumferential region other than the recessed portion 5*b* on the outer circumferential surface of the nut main body 5. A circulation groove 5*e* is formed on the cylindrical portion 5*c*. As illustrated in FIG. 4, a pair of through holes 5*f* is formed in the nut main body 5, and the pair of through holes 5*f* functions as the pair of connection paths 30. One end of each through hole 5*f* is open to an end portion of the circulation groove 5*e*, and the other end is open to the screw groove 5*a***.

The through hole 5*f* is linearly formed by machining using a drill or the like. In the illustrated example, two through holes 5*f* are connected to positions of the screw groove 5*a* that are different in phase by 180°+360n° (n=1, 2 . . . ), and are provided in parallel to each other.

The cover 6 is fixed to the outer circumferential surface of the nut main body 5, and is attached to the recessed portion 5*b* of the nut main body 5 in the illustrated example. The cover 6 in the illustrated example is a plate-shaped member having a uniform thickness, and is, for example, a press-molded product of a metal plate such as a steel plate. Alternatively, the cover 6 may be a resin molded product or a sintered body (MIM molded product). The cover 6 integrally includes a cylindrical portion 6*b*, a raised portion 6*c* raised outward from the cylindrical portion 6*b*, and attachment portions 6*d* provided at both circumferential ends of the cylindrical portion 6*b* (see FIGS. 1 and 3). An inner surface of the raised portion 6*c* of the cover 6 serves as a groove 6*a* (see FIG. 2). The cylindrical portion 6*b* covers the cylindrical portion 5*c* of the outer circumferential surface of the nut main body 5 from an outer diameter side, and the raised portion 6*c* covers the circulation groove 5*e* of the nut main body 5 from the outer diameter side. The attachment portions 6*d* are fixed to the outer circumferential surface of the nut main body 5 by an appropriate means such as swaging or adhesion.

The cover 6 is accommodated in a depth direction region of the recessed portion 5*b* on the outer circumferential surface of the nut main body 5. Specifically, an outermost diameter portion of the cover 6, that is, a top portion of the raised portion 6*c* is disposed on an inner diameter side relative to a virtual cylindrical surface extended from the large-diameter cylindrical surface 5*d* of the outer circumferential surface of the nut main body 5. As a result, the cover 6 does not protrude from the outer circumference of the nut main body 5, and therefore the outer diameter of the nut 2 is reduced.

The circulation path 20 is formed along the cylindrical portion 5*c* on the outer circumferential surface of the nut main body 5 (see FIG. 4). In the illustrated example, the circulation path 20 is formed by the circulation groove 5*e* formed on the cylindrical portion 5*c* of the nut main body 5 and the groove 6*a* (inner surface of the raised portion 6*c*) provided along the cylindrical portion 6*b* of the cover 6. The circulation path 20 extends in a direction inclined with respect to the axial direction and the circumferential direction (see FIG. 1). In the illustrated example, the circulation path 20 extends in a direction that forms a constant angle with respect to the circumferential direction. As illustrated in FIG. 1, when the circulation path 20 (the raised portion 6*c*) is viewed from the outer diameter side, a dimension of the circulation path 20 in a direction (an up-down direction in FIG. 1) orthogonal to the axial direction is larger than a dimension of the circulation path 20 in the axial direction (a left-right direction in FIG. 1). In particular, in the illustrated example, the dimension of the circulation path 20 in the direction orthogonal to the axial direction is larger than an outer diameter of the screw shaft 3 (an outer diameter at a top of a screw thread).

The connection paths 30 includes, for example, the through holes 5*f* provided in the nut main body 5. One end of each of the connection paths 30 is connected to an end portion of the rolling path 10, and the other end of each of the connection paths 30 is connected to an end portion of the circulation path 20. Each of the connection paths 30 extends in a direction tangent to an end portion (a start point or an end point) of the rolling path 10 in a cross section in a direction orthogonal to the axis (see FIG. 5), and extends in a direction orthogonal to the axial direction in an axial cross section. In the present embodiment, as illustrated in FIG. 4, the start point and the end point of the rolling path 10 are provided at positions different in phase by 180°+360n° (n=1, 2 . . . ), that is, on a plane L including an axial center of the nut main body 5, and the connection paths 30 extend from the start point and the end point, respectively. In this case, the pair of connection paths 30 is parallel. The start point and the end point of the rolling path 10 may be provided on a circulation path 20 side relative to the plane L (on an upper side in FIG. 4), and the connection paths 30 may extend from the start point and the end point. In this case, a distance between the pair of connection paths 30 gradually decreases from the rolling path 10 toward the circulation path 20. Alternatively, the start point and the end point of the rolling path 10 may be provided on a side opposite to the circulation path 20 relative to the plane L (on a lower side in FIG. 4), and the connection paths 30 may extend from the start point and the end point. In this case, the distance between the pair of connection paths 30 gradually increases from the rolling path 10 toward the circulation path 20.

A bent portion 40 is provided at a boundary between the circulation path 20 and each of the connection paths 30. Since the circulation path 20 is formed in an arch shape along the cylindrical portion 5*c* of the nut main body 5, a bending angle of the boundary between the circulation path 20 and each of the connection paths 30 can be made gentle. As a result, the balls 4 smoothly move from the connection path 30 to the circulation path 20 and the balls 4 smoothly circulate in the circulation passage, and therefore the nut 2 and the screw shaft 3 can be smoothly rotated relative to each other. In particular, the ball screw device 1 of the present embodiment is a nut rotation type, and since the circulation path 20 has an arch shape along the cylindrical portion 5*c* as described above, movement of the balls 4 in the circulation path 20 is promoted by centrifugal force during rotation of the nut 2, and the balls 4 circulate more smoothly.

Figure 5:
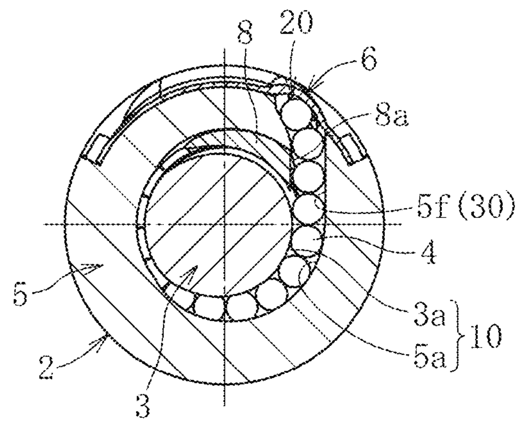
FIG. 5 is a cross-sectional view taken along line C-C in FIG. 2.

Coil-shaped ball pickup members 8 are screwed into the screw groove 5*a* of the nut main body 5 on both sides in the axial direction of the rolling path 10 (see FIGS. 2 and 3). As illustrated in FIG. 5, a guide surface 8*a* is provided at one end of each ball pickup member 8. The guide surface 8*a* of the ball pickup member 8 closes the screw groove 5*a* and is disposed at a position facing the connection path 30. The ball 4 that has reached the end point of the rolling path 10 is scooped up by the guide surface 8*a* of the ball pickup member 8, and is guided to the connection path 30 without entering the screw grooves 3*a* and 5*a* that do not constitute the rolling path 10.

Figure 6:
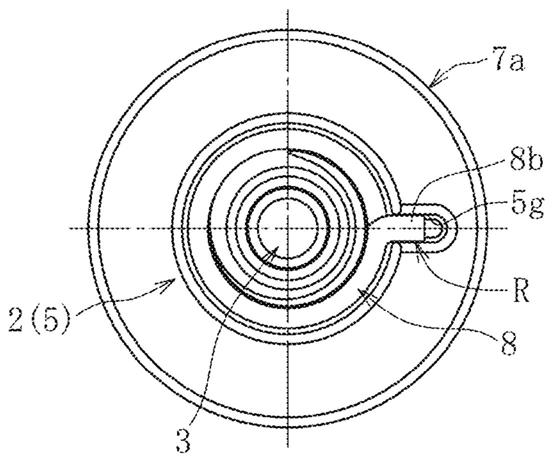
FIG. 6 is a side view as viewed from direction D in FIG. 1.
Figure 7:
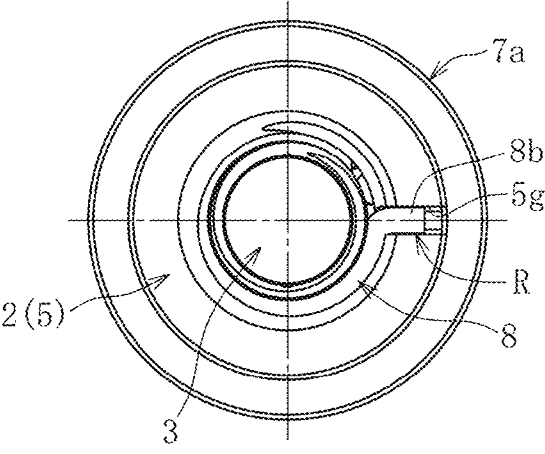
FIG. 7 is a side view as viewed from direction E in FIG. 1.

When the ball 4 repeatedly collides with the guide surface 8a of the ball pickup member 8, the ball pickup member 8 may rotate relative to the nut 2, and the position of the guide surface 8a may be displaced. In the present embodiment, a rotation stopping mechanism (rotation stoppers R) that restricts relative rotation between the ball pickup member 8 and the nut 2 is provided. In the present embodiment, the relative rotation between the ball pickup member 8 and the nut 2 is restricted by engaging the ball pickup member 8 and the nut 2 in both rotation directions. Specifically, as illustrated in FIGS. 6 and 7, the rotation stopping mechanism includes a locking portion 8*b* obtained by bending the other end (end portion on a side opposite to the guide surface 8*a*) of the ball pickup member 8 toward the outer diameter side, and a locking groove 5*g* provided in an end surface of the nut main body 5. By fitting the locking portion 8*b* of the ball pickup member 8 into the locking groove 5*g* of the nut main body 5 and engaging these members in the circumferential direction, rotation of the ball pickup member 8 relative to the nut 2 is restricted.

The ball screw device 1 can be assembled by the following procedure. First, the screw shaft 3 is inserted into the inner circumference of the nut main body 5, and the rolling path 10 is formed by the screw grooves 5*a* and 3*a*. Thereafter, the ball pickup members 8 are screwed into the screw groove 5*a* of the nut main body 5 from both sides in the axial direction, and the guide surface 8*a* is disposed at a predetermined position (see FIG. 5). Then, the balls 4 are inserted from the through hole 5*f* of the nut main body 5, and thereby the rolling path 10 and the pair of connection paths 30 are filled with the balls 4. Thereafter, the balls 4 are fitted into the circulation groove 5*e* of the nut main body 5, and the ball screw device 1 is completed by fixing the cover 6 covering an outer circumference of the nut main body 5 to the nut main body 5. As described above, in the ball screw device 1 of the present embodiment, the balls 4 can be easily incorporated into the circulation path 20 by disposing the balls 4 in the circulation groove 5*e* of the nut main body 5 and then covering the nut main body 5 with the cover 6.

The present invention is not limited to the above embodiment. Hereinafter, other embodiments of the present invention will be described, but description of points similar to those of the above embodiments will be omitted.

Figure 8:
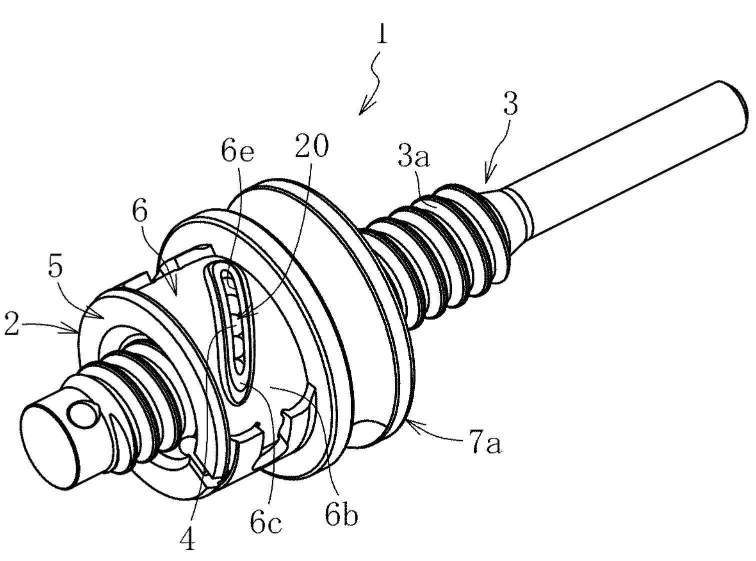
FIG. 8 is a perspective view of a ball screw device according to a second embodiment of the present invention.
Figure 9:
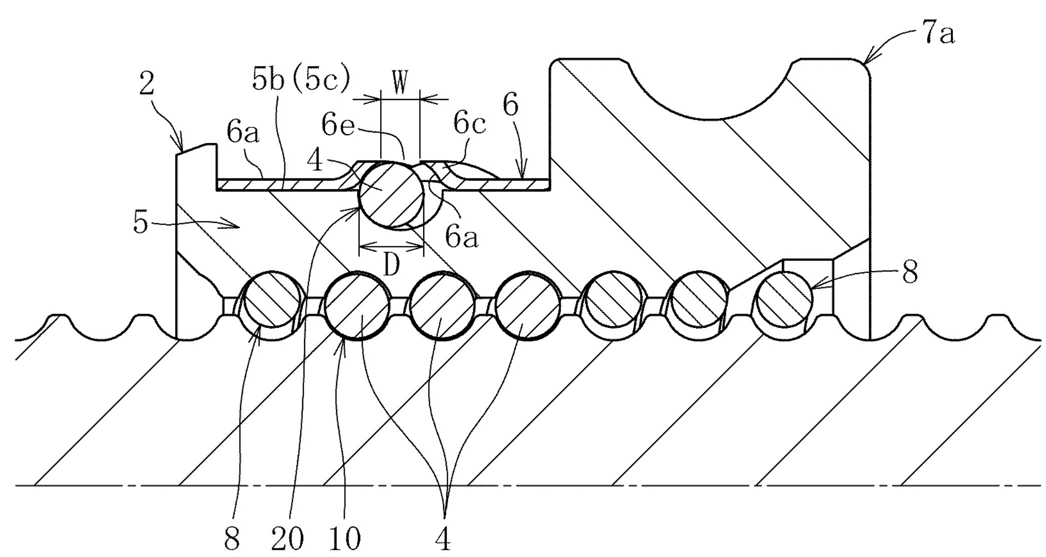
FIG. 9 is a cross-sectional view of the ball screw device of FIG. 8.

In a second embodiment illustrated in FIG. 8, a raised portion 6*c* of a cover 6 has an opening 6*e*. The opening 6*e* is provided at a top portion of the raised portion 6*c* (that is, a bottom portion of the groove 6*a*) and extends along a direction in which the raised portion 6*c* extends (that is, a direction in which the groove 6*a* extends). As illustrated in FIG. 9, a width W of the opening 6*e* is smaller than a diameter D of a ball 4. This prevents the ball 4 from falling off through the opening 6*e*. An edge of the opening 6*e*, that is, an end surface of the raised portion 6*c* provided around the opening 6*e* in the illustrated example is an outermost diameter portion of the cover 6, and this outermost diameter portion is disposed on an inner diameter side relative to the outermost diameter portion (the top portion of the raised portion 6*c*) of the cover 6 of the embodiment illustrated in FIG. 2. As a result, the outer diameter of the cover 6 is reduced, and it is easy to avoid interference with other members disposed on an outer circumference side of the cover 6.

Figure 10:
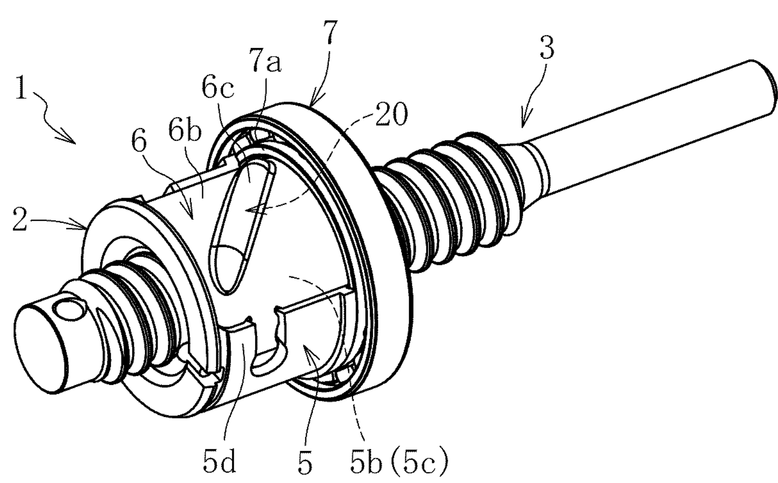
FIG. 10 is a perspective view of a ball screw device according to a third embodiment of the present invention.
Figure 11:
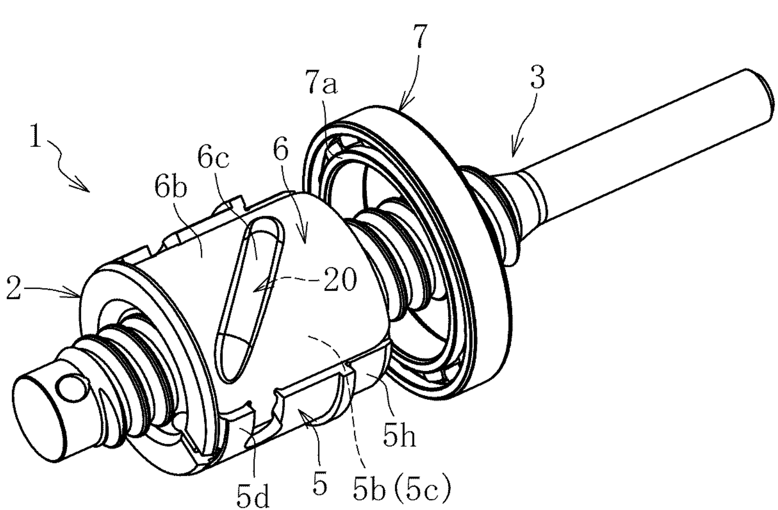
FIG. 11 is a partial exploded perspective view of the ball screw device of FIG. 10.
Figure 12:
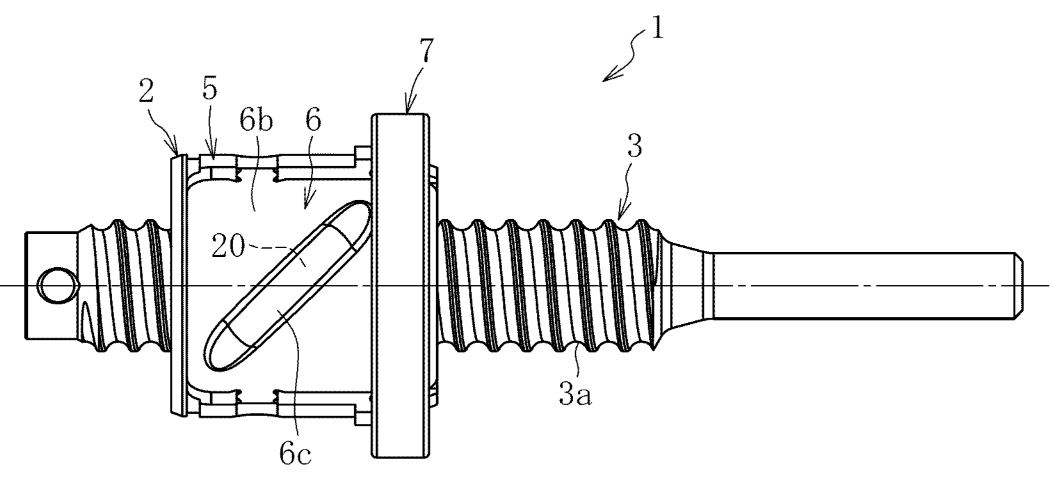
FIG. 12 is a plan view of the ball screw device of FIG. 10.

In a third embodiment illustrated in FIG. 10, a nut main body 5 and an inner ring 7*a* of a rolling bearing 7 are formed separately, and then the nut main body 5 and the inner ring 7*a* are fixed to each other. As illustrated in FIG. 11, an outer circumferential surface of the nut main body 5 has, in one axial end portion thereof, an attachment surface 5*h*, and the inner ring 7*a* is fixed to the attachment surface 5*h* by press fitting or the like. A recessed portion 5*b* (a cylindrical portion 5*c*) formed on the outer circumferential surface of the nut main body 5 reaches an axial region of the inner ring 7*a* of the rolling bearing 7, and a part of a cover 6 attached to the recessed portion 5*b* is disposed on an inner circumference side of the inner ring 7*a* (see FIG. 10). A radial gap is formed between the cylindrical portion 6*b* of the cover 6 and the inner circumferential surface of the inner ring 7*a*, and a part of the raised portion 6*c* of the cover 6 is present in the gap. That is, as illustrated in FIG. 12, a part of the raised portion 6*c* (a circulation path 20) of the cover 6 is disposed on an inner circumference side of the inner ring 7*a*.

In the embodiment illustrated in FIG. 1, the nut main body 5 and the inner ring 7*a* are integrally formed, and therefore the circulation groove 5*e* cannot be formed in an axial region of the inner ring 7*a* on the outer circumferential surface of the nut main body 5. On the other hand, in the embodiment illustrated in FIGS. 10 to 12, the inner ring 7*a* is assembled with the nut main body 5 after the circulation groove 5*e* and through holes 5*f* are formed in the nut main body 5, and therefore the circulation groove 5*e*, that is, the circulation path 20 can be extended to the axial region of the inner ring 7*a*, that is, the axial region of the attachment surface 5*h*. By thus extending the circulation path 20 in the axial direction, an axial dimension of a rolling path 10 can be enlarged, and therefore the number of balls 4 arranged in the rolling path 10 can be increased to increase a load capacity.

Figure 13:
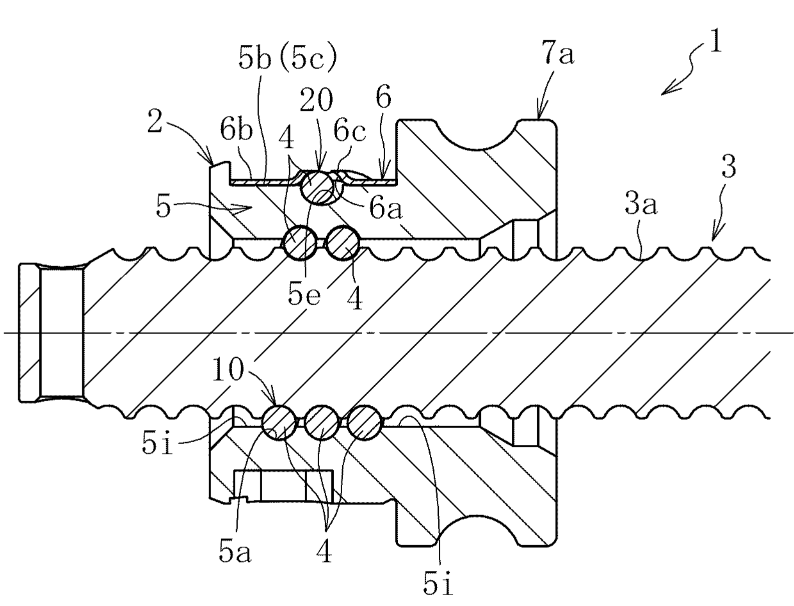
FIG. 13 is a cross-sectional view of a ball screw device according to a fourth embodiment of the present invention.
Figure 14:
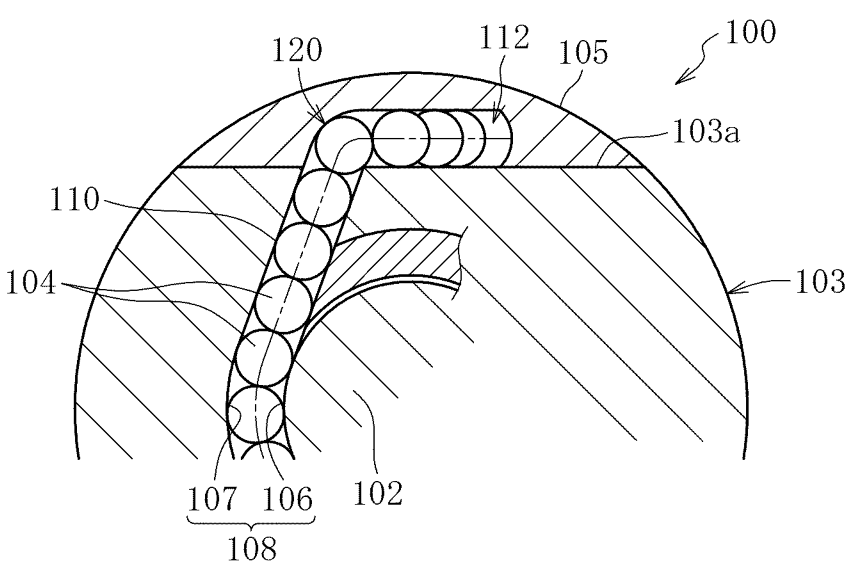
FIG. 14 is a cross-sectional view of a conventional ball screw device.

In a fourth embodiment illustrated in FIG. 13, a screw groove 5*a* on an inner circumferential surface of the nut main body 5 is provided only in a portion functioning as a rolling path 10. That is, a cylindrical surface 5*i* on which the screw groove 5*a* is not formed is provided in a region outside the rolling path 10 in the axial direction on the inner circumferential surface of the nut main body 5. In this case, a screw groove that does not function as the rolling path 10 is not provided, and therefore it is possible to avoid a situation in which a ball 4 enters such a screw groove. This makes it unnecessary to provide the ball pickup member 8 of the above embodiment, thereby reducing the number of components and a cost. Note that the cylindrical surface 51 may be provided only in a region on one side in the axial direction of the rolling path 10 on the inner circumferential surface of the nut main body 5, and the screw groove 5*a* may be formed in a region on the other side in the axial direction. In this case, an end portion of the screw groove 5*a* on the other side in the axial direction reaches an axial end portion of the inner circumferential surface of the nut main body 5, and therefore machining becomes easy.

REFERENCE SIGNS LIST

- 1 Ball screw device
- 2 Nut
- 3 Screw shaft
- 3*a* Screw groove
- 4 Ball
- 5 Nut main body
- 5*a* Screw groove
- 5*c* Cylindrical portion
- 5*e* Circulation groove
- 5*f* Through hole
- 5*g* Locking groove
- 6 Cover (circulation path forming member)
- 6*a* Groove
- 6*b* Cylindrical portion
- 6*c* Raised portion
- 7 Rolling bearing
- 7*a* Inner ring
- 8 Ball pickup member
- 8*a* Guide surface
- 8*b* Locking portion
- 10 Rolling path
- 20 Circulation path
- 30 Connection path

The invention claimed is:

1. A ball screw device comprising:

a nut including a nut main body having a screw groove on an inner circumference thereof and a circulation path forming member fixed to an outer circumferential surface of the nut main body;

a screw shaft having a screw groove on an outer circumference thereof;

a rolling path formed by the screw groove of the nut main body and the screw groove of the screw shaft;

a circulation path formed by the outer circumferential surface of the nut main body and the circulation path forming member;

a pair of connection paths that allow one end of the circulation path and one end of the rolling path to be communicated with each other and allow another end of the circulation path and another end of the rolling path to be communicated with each other, respectively; and a plurality of balls disposed in the rolling path, the circulation path, and the pair of connection paths, wherein the circulation path is formed in an arch shape along a cylindrical portion of the outer circumferential surface of the nut main body, wherein a pair of through holes is formed in the nut main body, the pair of through holes functioning as the pair of connection paths, wherein the circulation path is formed by a circulation groove formed in the cylindrical portion of the outer circumferential surface of the nut main body and a groove provided on the circulation path forming member, wherein the circulation path forming member comprises a portion forming the groove, the portion forming the groove covering the circulation groove and the through holes of the nut main body from an outer diameter side, and wherein an entirety of the portion forming the groove is provided on an outer diameter side of the cylindrical portion of the nut main body.

2. The ball screw device according to claim 1, wherein the outer circumferential surface of the nut main body has, in a circumferential partial region thereof, a recessed portion recessed toward an inner diameter side relative to another circumferential region, and the circulation path forming member is accommodated in a depth direction region of the recessed portion.

3. The ball screw device according to claim 1, wherein the circulation path forming member has a groove that forms the circulation path, the groove has, in a bottom portion thereof, an opening extending along a direction in which the groove extends, and an edge of the opening is an outermost diameter portion of the circulation path forming member.

4. The ball screw device according to claim 1, wherein the circulation path forming member is fixed to the nut main body by swaging.

5. The ball screw device according to claim 1, wherein the circulation path forming member is fixed to the nut main body by adhesion.

6. The ball screw device according to claim 1, further comprising:

coil-shaped ball pickup members screwed into the screw groove of the nut main body; and rotation stoppers that restrict relative rotation between the coil-shape ball pickup members and the nut, wherein the coil-shaped ball pickup members each have, at an end portion thereof, a guide surface that guides the balls from the rolling path to one of the connection paths.

7. The ball screw device according to claim 1, wherein the nut main body and an inner ring of a rolling bearing are integrally formed as one component.

8. The ball screw device according to claim 1, wherein the outer circumferential surface of the nut main body has an attachment surface to which an inner ring of a rolling bearing is attached; and the circulation path extends to an axial region of the attachment surface.

9. The ball screw device according to claim 1, wherein an inner circumferential surface of the nut main body has, in a region on one side in an axial direction relative to the rolling path, a cylindrical portion in which the screw groove is not formed.

10. The ball screw device according to claim 1, wherein a pair of through holes is formed in the nut main body, the pair of through holes functions as the pair of connection paths, and the through holes are parallel to each other.

11. The ball screw device according to claim 1, wherein when the circulation path is viewed from an outer side of a radial direction of the nut passing through a center in a longitudinal direction of the circulation path, a dimension of the circulation path in a direction orthogonal to an axial direction is larger than a dimension of the circulation path in the axial direction.

12. The ball screw device according to claim 1, wherein the circulation path forming member is a press-molded product of a metal plate.

13. The ball screw device according to claim 1, wherein the circulation path forming member is a sintered body.

* * * * *